UNITED STATES PATENT OFFICE.

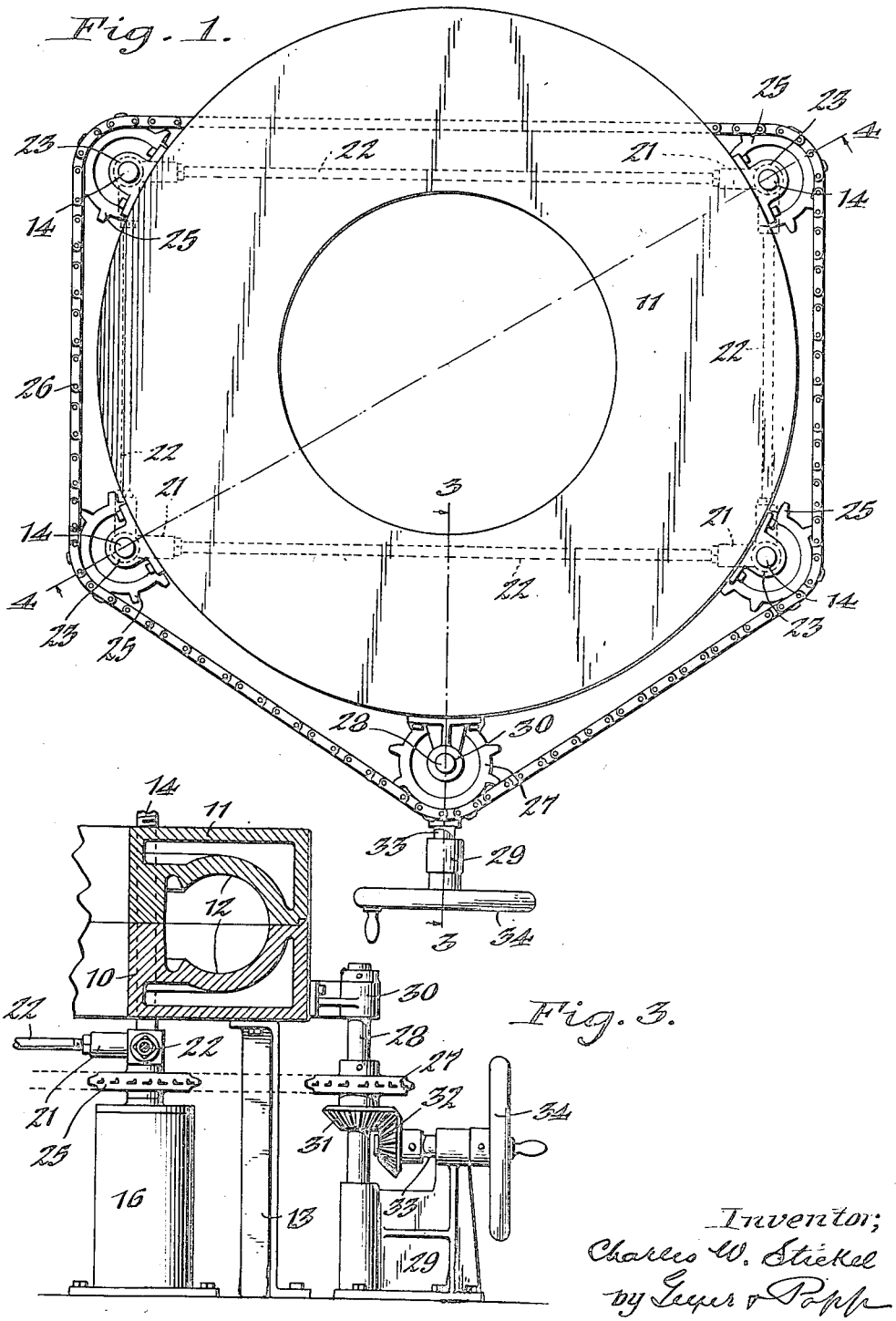

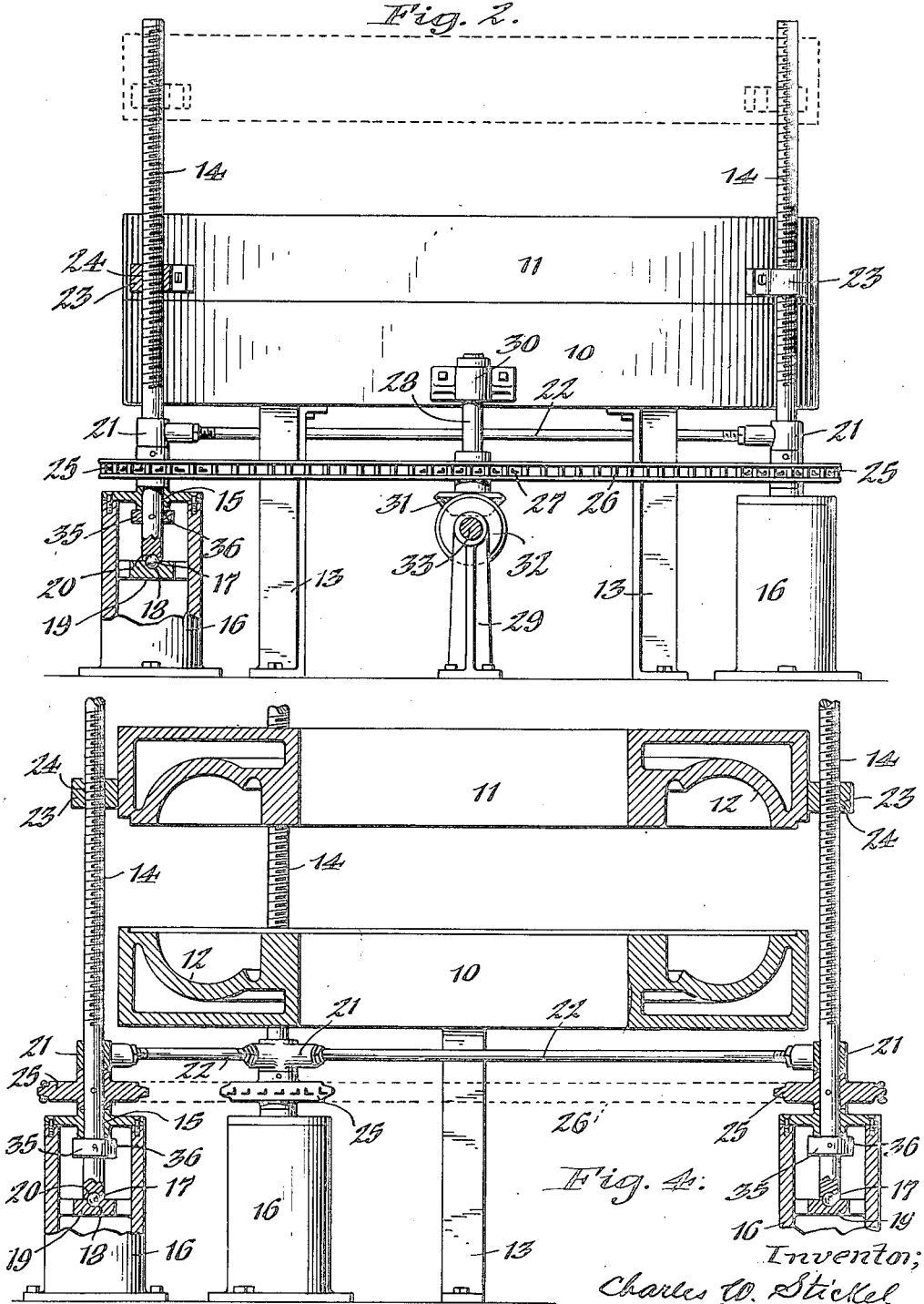

CHARLES W. STICKEL, OF ROCHESTER, NEW YORK, ASSIGNOR TO GOOD LUCK TIRE & RUBBER CO., OF BUFFALO, NEW YORK, A CORPORATION OF ARIZONA.

TIRE-MOLDING APPARATUS.

1,376,123.   Specification of Letters Patent.   Patented Apr. 26, 1921.

Application filed July 2, 1920. Serial No. 393,505.

*To all whom it may concern:*

Be it known that I, CHARLES W. STICKEL, a citizen of the United States, residing at Rochester, in the county of Monroe and State of New York, have invented new and useful Improvements in Tire-Molding Apparatus, of which the following is a specification.

This invention relates to an apparatus for tire molds whereby the upper and lower mold sections may be brought together for vulcanizing or curing the tire and separated for permitting the insertion and removal thereof.

It is the object of this invention to provide an apparatus of this character for guiding and moving one of the mold sections toward and from the other uniformly, steadily and in parallelism.

A further object is to provide means whereby the mold sections are always in vertical alinement with one another.

A still further object is to provide a simple and efficient apparatus of this character which utilizes a minimum amount of power and labor.

In the accompanying drawings:

Figure 1 is a top plan view of a tire mold embodying my improvement. Fig. 2 is a front view thereof, partly in section. Fig. 3 is a transverse vertical section on line 3—3, Fig. 1. Fig. 4 is a fragmentary transverse vertical section on line 4—4, Fig. 1.

Similar characters of reference indicate corresponding parts throughout the several views.

10 represents the lower section of the mold body which is preferably fixed or stationary, and 11 the upper section which is movable toward and from the other section. Both sections are of annular form and are provided with annular recesses 12 of substantially semi-circular form in cross section which together form a cavity for the reception of the tire being treated. The lower section 10 may be supported in any suitable manner, for instance, on legs or standards 13 bolted or otherwise fastened to the bottom thereof.

The means for moving the upper mold section toward and from the lower mold section are preferably constructed as follows:

14 represents a plurality of vertical screw rods arranged about the mold sections and journaled adjacent their lower ends in bearings 15 formed in the base supports 16, these rods being supported at their bottoms on step or thrust bearings 17, each of which is in the form of a ball. Each of these bearings is seated in a recess 18 formed in a bridge or cross piece 19 arranged on the interior of the base, and the opposing end of each screw is provided with a similar recess or socket 20 which rests on the ball bearing. These screw rods are also supported above the supports 15 but below the bottom of the lower mold section 10 in bearing arms 21 which are connected to each other by tie rods 22. Said screw rods are provided with square threads and are threaded from a point above the bearing arms 21 to the top of the rods.

The upper mold section is provided with a plurality of nuts in the form of brackets 23 which are bolted or otherwise fastened to the outer wall thereof and which are provided with threaded openings 24 engaging with the screw rods 14, so that when the latter are turned in one direction or the other, the mold section 11 is correspondingly raised or lowered uniformly and in a vertical path.

The screw rods 14 are prevented from longitudinal movement relatively to the mold sections and for this purpose the lower end of each screw rod is provided with a thrust collar 35 pinned or otherwise secured thereto which bears at its upper side against the opposing edge of the flange 36 formed in the head of the respective base 16.

The lower ends of the screw rods above their respective base 16 are provided with sprocket wheels 25, all of which are connected by an endless sprocket chain 26 passing around the outer sides thereof, so as to rotate in unison, and thereby cause a uniform and steady raising and lowering of the upper mold section relatively to the lower one. The front portion of this chain passes around a sprocket wheel 27 mounted on a vertical shaft 28 journaled at its lower end in a bearing formed in a bracket 29 and at its upper end in a bearing 30 fixed to the outer wall of the lower mold section. By transmitting motion to the shaft 28, the screw rods are simultaneously rotated through the medium of the sprocket wheels and chain connected therewith, and the upper mold section is correspondingly raised or lowered. Any means may be employed for rotating this shaft, but preferably by providing the same with a bevel gear 31 which meshes with a bevel gear 32 mounted on a horizontal arbor 33 journaled in the bearing bracket 29 and rotated by a suitable hand wheel 34 secured to its outer end.

The operation of the apparatus is as follows:

Assuming the parts to be in the position shown in Fig. 4 of the drawings, with the respective mold sections separated from each other, the tire to be treated is placed in the lower mold section. The hand wheel 34 is then rotated in the proper direction to cause the upper section to be lowered into engagement with the lower section, the final turn or turns of the hand wheel causing the sections to be forced tightly together in parallelism and under uniform pressure at all sides thereof. After the tire is properly treated and it is desired to separate the mold sections, the hand wheel is turned in the opposite direction to raise the upper sections sufficiently to permit the convenient removal of the tire therefrom.

I claim as my invention:

1. In an apparatus of the character described, the combination of a stationary lower mold section, an upper mold section movable relatively to said lower mold section, and means for raising and lowering said upper mold section relatively to said lower mold section comprising bearing supports, vertical screw rods journaled in said supports, screw nuts arranged on said upper mold section and engaging with said screws, sprocket wheels mounted on the latter, a sprocket chain connected to said sprocket wheels, and means for transmitting motion to said chain.

2. In an apparatus of the character described, the combination of a stationary lower mold section, an upper mold section movable relatively to said lower sections, and means for raising and lowering said upper mold section relatively to the lower section comprising base supports arranged adjacent to said lower mold section, vertical screw rods journaled in said supports, screw nuts arranged on said upper mold section and engaging with said screws, sprocket wheels mounted on the latter, a sprocket chain connected to said sprocket wheels, and means for transmitting motion to said chain.

3. In an apparatus of the character described, the combination of a stationary lower mold section, an upper mold section movable relatively to said lower section, base supports arranged adjacent to said lower section and provided with stop flanges, a step bearing arranged in each of said supports, vertical screw rods journaled in the latter and supported on said bearings, each of said screw rods being provided with a thrust collar engaging the opposing edge of the flange of the corresponding support, screw nuts arranged on said upper mold section and engaging with said screw rods, and means for simultaneously rotating the latter.

CHARLES W. STICKEL.